United States Patent Office 3,840,603
Patented Oct. 8, 1974

3,840,603
FLUORINATED CYCLOBUTENYL ALKYL ETHER COPOLYMERS
Richard W. Anderson, Englewood, Colo., and Hughie R. Frick, Midland, Mich., assignors to The Dow Chemical Company, Midland, Mich.
No Drawing. Filed Mar. 2, 1972, Ser. No. 231,404
Int. Cl. C07c 43/12
U.S. Cl. 260—611 B        7 Claims

ABSTRACT OF THE DISCLOSURE

Disclosed are highly fluorinated polymers of the formula:

$$I-\left[\left(\bigcirc_F\right)_x \left(R_f-O-R_f'\right)_y\right]_n-I$$

In the above formula, $R_f$ and $R_f'$ are straight chain perfluoroalkylene groups or perfluorooxaalkylene having a combined number of carbon atoms totaling from 3 to 20, $n$ is a number of from 2 to 10,000 representing the degree of polymerization and the ratio of $x:y$ ranges from 0.001:1 to 1000:1. The polymers are thermally stable and flexible. In addition they contain double bonds as cross-linking sites.

BACKGROUND OF THE INVENTION

Perfluorinated cyclobutadiene polymers have been made. We report their preparation in co-pending application S.N. 869,338, filed Oct. 24, 1969. These polymers have good thermal stability, but at high molecular weights they are inflexible. Likewise, polymers of perfluorinated ethers are reported in U.S. Pat. 3,505,411. These polyethers are flexible, but because of their high chemical stability are difficult to crosslink by normal chemical methods. This invention combines the two systems in such a way that flexible polymers result containing double bonds which can act as crosslinking sites.

SUMMARY OF THE INVENTION

The present invention comprises highly fluorinated polymers of the formula:

$$I-\left[\left(\bigcirc_F\right)_x \left(R_f-O-R_f'\right)_y\right]_n-I$$

and a method for their preparation. In the above formula, $R_f$ and $R_f'$ are straight chain perfluoroalkylene or perfluorooxaalkylene having a combined number of carbon atoms of from 3 to 20, $n$ is a number of from 2 to 10,000 representing the degree of polymerization and the ratio of $x:y$ ranges from 0.001:1 to 1000:1.

DETAILED DESCRIPTION

The polymers are prepared by a coupling type polymerization in which mercury and ultraviolet light are employed as reaction promoters. The reaction time may range from 1 hour to 6 months or more depending on the degree of polymerization desired. The reaction temperature may vary from −30° C. to 250° C. with a temperature of from 20° to 150° C. being preferred.

The monomeric materials are iodine terminated in order for the coupling reaction to proceed. The general reaction is set out in equation (I).

(I)

$$XI-\left[\bigcirc_F\right]-I + VI-R_f-O-R_f'-I \xrightarrow[\text{[U.V.]}]{\text{[Hg]}}$$

$$I-\left[\left(\bigcirc_F\right)_x \left(R_f-O-R_f'\right)_y\right]_n-I + nHgI_2$$

In the above formula, $R_f$ and $R_f'$ are perfluoroalkylene groups or perfluorooxaalkylene groups selected so that the total number of carbon atoms in the I—$R_f$—O—$R_f'$—I group ranges from 3 to 20. Specific examples of $R_f$ and $R_f'$ are perfluorinated methyl, propyl, pentyl, decyl, dodecyl, tetradecyl and hexadecyl. The $R_f$ and $R_f'$ groups may independently be perfluorooxaalkylene examples of which are $(CF_2)_2$—O—$(CF_2)_3$, —$(CF_2)_3$—O—$(CF_2)_5$—, and, —$(CF_2)_3$—O—$(CF_2)_5$—.

The preferred polymers of the instant invention are those in which $n$ is a number from 2 to 1,000, the combined number of carbon atoms in $R_f$ and $R_f'$ is from 3 to 11 and the ratio of $x:y$ ranges from 1:5 to 5:1. When a liquid or rubbery polymer is desired, the 1:5 ratio is selected.

The iodine terminated perfluoro cyclobutene is prepared as set out in co-pending application 869,338. The iodine terminated ether may be prepared by the process disclosed in U.S. Pat. 3,505,411. Iodine terminated polyethers are also prepared by reacting a difunctional perfluoroacetyl fluoride with tetrafluoro ethylene in the presence of potassium fluoride and iodine. This preparation is indicated by equation (2)

(2)

$$\underset{P}{\overset{O}{\underset{\|}{C}}}-(CH_2)_n-\underset{F}{\overset{O}{\underset{\|}{C}}} + KF \longrightarrow$$

$$K^+-O-\underset{F}{\overset{F}{\underset{|}{C}}}-(CH_2)_n-\underset{F}{\overset{F}{\underset{|}{C}}}-O-K^+ \xrightarrow{CF_2CF_2}{I_2}$$

$$I-\underset{F}{\overset{F}{\underset{|}{C}}}-\underset{F}{\overset{F}{\underset{|}{C}}}-O-\underset{F}{\overset{F}{\underset{|}{C}}}-(CF_2)_n-\underset{F}{\overset{F}{\underset{|}{C}}}-O-\underset{F}{\overset{F}{\underset{|}{C}}}-\underset{F}{\overset{F}{\underset{|}{C}}}-I$$

In the above reaction $n$ is a number from 1 to 14 thus providing a diether having up to 20 carbon atoms.

A method for preparing iodine terminated monoethers is represented by equation (3):

(3)

$$Ag-O-\overset{O}{\underset{\|}{C}}-(CF_2)_n-O-(CF_2)_m-\overset{O-O-Ag}{\underset{\|}{C}} \xrightarrow{I_2}{\Delta}$$

$$I(CF_2)_n-O-(CF_2)_m I + 2AgI + 2CO_2$$

In the above equation, $m+n$ is equal to from 3 to 20.

The invention is further illustrated by the following examples.

EXAMPLES 1-5

In each of the following examples, polymers were prepared by reacting perfluoro 3,4 - diiodocyclobutene with perfluoro - 1,11 - diiodo - 3,9 - dioxaundecane to form a polymer of the formula:

$$I-\left[\left(\bigcirc_F\right)_x \left(CF_2-CF_2-O-(CF_2)_5-O-CF_2-CF_2\right)_y\right]_n-I$$

The reaction was carried out in a glass pressure vessel containing excess elemental mercury. In each run $$CCl_2FCClF_2$$

was employed as solvent. The reaction mass was irradiated with ultraviolet light while being cooled to 30 to 40° C. with a stream of air. After the reaction had gone to completion, as indicated by the presence of black mercuric iodide, the reaction mixture was centrifuged, with the freon soluble portion of the polymer being decanted off, leaving the mercuric iodide and insoluble portion of the polymer behind. Then the soluble portion of the polymer was washed with aqueous potassium iodide. The solvent was evaporated to recover the polymer and the insoluble portion purified by vacuum subliming the mercury and mercury iodides from the polymer.

The ratio of perfluorobutene moieties to perfluoroether moieties in the polymer are modified by adjusting the stoichiometry. The degree of polymerization in each run was determined by iodine end group analysis.

The reactants and products of examples 1–5 are set out in Table I.

Due to their high fluorine content these compounds exhibit good thermal and oxidation resistance. The liquid polymers are useful as hydraulic fluids for high temperature applications such as breaking systems. The solid polymers can be used to form ablatives and gaskets for uses in which stability is essential.

TABLE I

| | Reaction parameters | | | | | | Product parameters | |
|---|---|---|---|---|---|---|---|---|
| | Cyclobutene (X) | Ether (Y) | Ratio X:Y | Mercury gm. | Solvent, ml. | Time, hours | Degree of polymerization | Physical properties |
| 1 | 11.6 gm. (0.034 mole) | 5.0 gm. (0.0068 mole) | 5:1 | 10.0 | 50 | 309 | $n=\sim 35$ | Soft solid. |
| 2 | 0.412 gm. (0.00109 mole) | 4.0 gm. (0.0054 mole) | 1:5 | 10.0 | 25 | 76 | $n=\sim 350$ | Mobile nonvolatile liquid. |
| 3 | 1.285 gm. (0.0034 mole) | 5.0 gm. (0.0068 mole) | 1:2 | 10.0 | 25 | 112 | $n=\sim 300$ | Do. |
| 4 | 2.57 gm. (0.0068 mole) | 5.0 gm. (0.0068 mole) | 1:1 | 10.1 | 25 | 196 | $n=\sim 300$ | Do. |
| 5 | 5.14 (0.0136 mole) | 5.0 gm. (0.0068 mole) | 2:1 | 10.2 | 25 | 177 | $n=\sim 160$ | Do. |

We claim:

1. A highly fluorinated polymer of the formula:

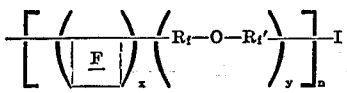

wherein $R_f$ and $R_f'$ are straight chain perfluoroalkylene groups or perfluorooxalkylene groups having a combined number of carbon atoms totaling from 3 to 20, $n$ is a number from 2 to 10,000 representing the degree of polymerization and the ratio of $x:y$ ranges from 0.001:1 to 1000:1.

2. The polymer of claim 1 wherein $n$ is a number from 2 to 1000.

3. The polymer of claim 2 wherein the ratio of $x:y$ ranges from 1:5 to 5:1.

4. The polymer of claim 3 wherein the combined number of carbon atoms in $R_f$ and $R_f'$ totals 3 to 11.

5. The polymer of claim 1 wherein $R_f$ and $R_f'$ are perfluorinated methyl, propyl, pentyl, decyl, dodecyl, tetradecyl or hexadecyl.

6. The polymer of claim 1 wherein $R_f$ and $R_f'$ are each selected from $-(CF_2)_2-O-(CF_2)_3-$, $$-(CF_2)_3-O-(CF_2)_5-$$

or $-(CF_2)_2-O-(CF_2)_5-$.

7. The polymers of claim 1 wherein $R_f$ is

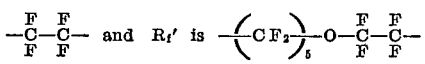

References Cited
UNITED STATES PATENTS

| 3,505,411 | 4/1970 | Rice | 260—615 BF |
| 3,657,306 | 4/1972 | Murray | 260—611 RX |
| 3,697,564 | 10/1972 | Anello et al. | 260—911 RX |

HOWARD T. MARS, Primary Examiner

N. MORGENSTERN, Assistant Examiner

U.S. Cl. X.R.

204—158; 252—11, 52 A, 54; 260—823

UNITED STATES PATENT OFFICE
CERTIFICATE OF CORRECTION

Patent No. 3,840,603          Dated October 8, 1974

Inventor(s)  Richard W. Anderson & Hughie R. Frick

It is certified that error appears in the above-identified patent and that said Letters Patent are hereby corrected as shown below:

Column 1, line 64, delete "equation (I)" and insert --equation (1)--;

Column 1, line 65, delete "(I)" and insert --(1)--;

Column 1, line 66, delete "XI" and insert --xI--;

Column 1, line 68, delete "VI" and insert --yI--;

Column 2, line 8, delete the entire line and insert -- are $-(CF_2)_2-O-(CF_2)_3-$, $-(CF_2)_3-O-(CF_2)_5-$, and, --;

Column 2, line 30, delete "$CH_2$" and insert --$CF_2$--;

Column 2, line 33, at the end of the formula insert --+KI--;

Column 2, line 40, change the formula to read

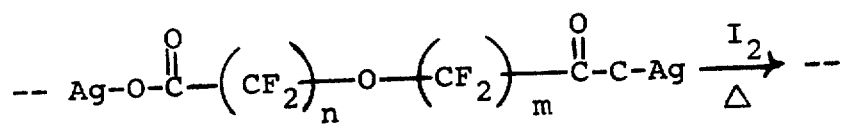

Column 3, line 30, at the beginning of the formula insert --I--;

Column 3, line 36, correct the spelling of the third word to read --perfluorooxaalkylene--.

Signed and sealed this 21st day of January 1975.

(SEAL)
Attest:

McCOY M. GIBSON JR.
Attesting Officer

C. MARSHALL DANN
Commissioner of Patents